US008038743B1

(12) United States Patent
Wootton et al.

(10) Patent No.: US 8,038,743 B1
(45) Date of Patent: Oct. 18, 2011

(54) SYSTEMS AND METHODS FOR SUPERCRITICAL WATER REFORMATION OF FUELS AND GENERATION OF HYDROGEN USING SUPERCRITICAL WATER

(75) Inventors: John R. Wootton, St. Louis, MO (US); Sunggyu Lee, Columbia, MO (US); Asdrubal Garcia-Ortiz, Chesterfield, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 1071 days.

(21) Appl. No.: 10/723,543

(22) Filed: Nov. 26, 2003

Related U.S. Application Data

(60) Provisional application No. 60/429,768, filed on Nov. 27, 2002, provisional application No. 60/468,339, filed on May 6, 2003.

(51) Int. Cl.
*B01J 7/00* (2006.01)

(52) U.S. Cl. ......... 48/61; 48/75; 48/63; 48/105; 48/107; 48/94; 48/198.3; 48/95; 48/215; 48/214 R; 48/127.9; 422/188; 422/211; 422/187; 422/189; 422/194; 208/106; 208/133; 60/780; 423/648.1; 423/650; 423/652

(58) Field of Classification Search ........... 48/61, 127.9, 48/198.7, 210, 198.3
See application file for complete search history.

(56) References Cited

U.S. PATENT DOCUMENTS

| 2,630,378 | A | * | 3/1953 | Gee ................................ 48/206 |
| 5,080,692 | A | | 1/1992 | Lee et al. |
| 5,141,823 | A | * | 8/1992 | Wright et al. .................. 429/19 |
| 5,386,055 | A | | 1/1995 | Lee et al. |
| 5,516,952 | A | | 5/1996 | Lee et al. |
| 5,663,237 | A | | 9/1997 | Lee et al. |
| 6,340,722 | B1 | | 1/2002 | Lee et al. |
| 2003/0168381 | A1 | * | 9/2003 | Hokari et al. ................. 208/106 |

OTHER PUBLICATIONS

Supercritical Fluids-Fundamental and Applications, E. Kiran, P.G. Debenedetti and C.J. Peters, eds., Kluwer Academic Publishers, Dordrecht, The Netherlands, 2000. Chapters 1, 13, 14, 17, 19, 20 and 22.
Supercritcial Fluids-Molecular Interactions, Physical Properties, and New Applications, Y. Arai, T. Sako and Y. Takebayashi, eds., Springer series in material processing, Springer-Verlag Berlin Heidelberg, 2002, Chapters 1, 4, 5 and 6.
Baird, S., "Fuel Reforming," http://myhome.naver.com/scienleader/energy/e26.html, undated.
Penn State University, Energy & Geo-Environmental Engineering, "Methods of converting/extracting Hydrogen," previously available online at http://www.personal.psu.edu/users/c/d/cdr171/methods.html, undated.
FCTec, "What is a fuel cell?," http://www.fctec.com/fctec_basics.asp, undated.
Shaw, R.W., "Supercritical Water Oxidation of Toxic Military Materials: Current Status," US Army Research Office, Research Triangle Park, NC, undated.
General Atomics and Affiliated Companies, "Supercritical Water Oxidation: State-of-the-Art Environmental Technology," previously available online at http://www.ga.com, undated.

* cited by examiner

Primary Examiner — Kaity V. Handal
(74) Attorney, Agent, or Firm — SNR Denton US LLP

(57) ABSTRACT

A supercritical water reformer (SCWR) and methods for using supercritical water to convert hydrocarbons, particularly hydrocarbon fuels such as diesel fuel or gasoline, into carbonaceous gases and hydrogen. The synthesis gas stream generated by the fuel reforming reaction can then be further refined to increase hydrogen content, and the resultant hydrogen can be utilized to power fuel cells.

18 Claims, 2 Drawing Sheets

SYSTEMS AND METHODS FOR SUPERCRITICAL WATER REFORMATION OF FUELS AND GENERATION OF HYDROGEN USING SUPERCRITICAL WATER

CROSS REFERENCE TO RELATED APPLICATION(S)

This application claims priority to U.S. provisional application Ser. Nos. 60/429,768 filed Nov. 27, 2002 and 60/468,339 filed May 6, 2003. The entire disclosure of both documents is herein incorporated by reference.

BACKGROUND OF THE INVENTION

1. Field of the Invention

This disclosure relates to the field of hydrocarbon reformation. In particular to the use of supercritical water to reform diesel fuel and to use supercritical water to obtain hydrogen.

2. Description of the Related Art

There is a desire in America and around the world to utilize so called clean power sources. One of the technologies that has been making a particular impression in clean power is the so-called "fuel cell" which produces electricity by the electrochemical reaction of an oxidizer and a fuel (generally hydrogen gas). While the process is similar in many ways to a battery, fuel cells have the advantage that they do not run down or require recharging, so long as there is fuel and oxidant, there is electricity.

The operation of a fuel cell is relatively straight forward. Protons flow from the fuel electrode (anode) through an ion-conducting membrane to an oxidant electrode (cathode) and combine with oxygen to form water. The electrons in turn flow from the anode to the cathode, through an external electric circuit, to create electricity. As the electricity is created through the chemical combination, there is no combustion and, therefore, the associated by-products of combustion are eliminated.

Fuel cells have drawn particular interest in automobile and vehicle power, but are useable for any type of technology where electricity can be used as power. In particular, the fuel cell may replace conventional chemical batteries or even conventional electric power plants. The fuel cell is of particular interest because it can operate at efficiencies two to three times that of the internal combustion engine, and it requires no moving parts. Further, the fuel cell operates "clean" since the only outputs of its process (presuming hydrogen is used as fuel) are heat, electricity, and water.

The biggest hurdle to the fuel cell concept, particularly in vehicle use, is to obtain hydrogen in sufficient quantities and at reasonable cost to make the fuel cell economically competitive. Further, in order to switch vehicles to fuel cell power, it is necessary for there to be infrastructure to distribute hydrogen to provide the hydrogen fuel to the fuel cells. Because of the lack of infrastructure to distribute hydrogen to consumers, especially when compared to existing infrastructure to distribute fossil fuels, many of the proposals for hydrogen generation reform existing automobile fuels into hydrogen. Further, other consumers, such as the military, are interested in being able to obtain hydrogen as fuel at remote locations. Many of these consumers also already rely on internal combustion engine power sources and already have extensive infrastructure and support structure dedicated to distributing fossil fuels.

Reforming is preferable because it allows for existing fossil fuel distribution infrastructure to be converted over time to a hydrogen distribution infrastructure, without inconvenience to first adopters of hydrogen technology, by allowing hydrogen to be obtained at conventional sources where fossil fuels are already available. Because of the need for infrastructure to be available to lead to technology adoption, some technologies for producing hydrogen simply require too specialized of materials and transportation infrastructure to be utilized efficiently at this time.

Reforming technologies allow for hydrogen to be generated wherever there are already fossil fuel sources present by reforming the fossil fuel into hydrogen. For instance, hydrogen may be formed at the refinery and distributed, or, if the reformer equipment is sufficiently small, a reformer may be placed at a conventional service station to reform automobile fuels into hydrogen on demand. If the reformer is small enough, it may even be used on-board an automobile.

Some of the most well known types of fuel reforming systems are steam reforming, partial oxidation and Autothermal reforming (ATR) (which is essentially a process using both steam reforming and partial oxidation together to eliminate inefficiencies). The problems with ATR reformers are that they require a very high temperature (850° C. or higher) and an expensive catalyst such as platinum or nickel to be effective. Further, the catalyst reactivity normally drops very rapidly as the process continues due to poisoning of the catalyst through impurities (such as sulfurous compounds or carbonyls) formed in the process unless expensive fuel prefiltering processes are used. Therefore, ATR technologies may be impracticable for use without significant safety, filtering, and power requirements. These requirements can, in turn, render the technology ineffective for use with existing fossil fuel infrastructure.

SUMMARY

Because of these and other problems in the art, described herein are systems and methods for using supercritical water in a process for converting hydrocarbon fuels, such as, but not limited to, diesel and other automotive, marine, or aircraft fuels into hydrogen. Further, there is described herein systems for using supercritical water to generate hydrogen, principally for use as a fuel in fuel cells, from hydrocarbons.

Described herein, in an embodiment is a method for generating hydrogen from a hydrocarbon comprising: having a supercritical water reformer (SCWR); providing the SCWR both supercritical water and at least one hydrocarbon; using supercritical water to reform the hydrocarbon into hydrogen; and capturing the hydrogen.

In an embodiment, the hydrocarbon is included in at least one of: gasoline, a biomass fuel, and diesel fuel or may comprise a paraffin, a naphthene, an olefin, an aromatic, methane, propane, ethane, octane, or dodecane.

In an embodiment, in the step of providing sulfur also provided to the SCWR. In an embodiment, in the step of using, the hydrocarbon is reformed into a synthesis gas including hydrogen and carbon monoxide and prior to the step of capturing, the synthesis gas may be passed through a forward water-gas shift (WGS) reactor to increase the amount of hydrogen in the synthesis gas.

In an embodiment, in the step of capturing the hydrogen is captured as a chemical hydride such as, but not limited to, a metal hydride or is captured using carbon nanotubes.

In an embodiment, the step of providing also includes providing oxygen into the SCWR such as, but mot limited to, as a component of air.

In an embodiment, the method further comprises the steps of monitoring the SCWR and controlling the step of providing based on the monitoring to make the step of using more efficient.

In another embodiment, there is described a system for reforming diesel fuel into hydrogen comprising: feeds for water and diesel fuel; a supercritical water (SCW) reactor; a water-gas shift (WGS) reactor; and a capturing system; wherein, water and diesel fuel are fed by the feeds; wherein the water is placed into a supercritical state; wherein, the SCW reactor reforms the diesel fuel into a synthesis gas including hydrogen and carbon monoxide and outputs the synthesis gas; wherein the synthesis gas output by the SCW reactor is fed into the WGS reactor which converts the carbon monoxide into carbon dioxide and hydrogen and outputs an output gas including a higher percentage of hydrogen to carbon monoxide compared to the synthesis gas; and wherein the hydrogen in the output gas is captured by the capturing system.

In another embodiment of this system, the capturing system captures the hydrogen in a chemical hydride such as, but not limited to, sodium hydride or boron hydride.

In another embodiment oxygen is fed into the SCW reactor in conjunction with the diesel fuel and the water such as, but not limited to, as a component of air In another embodiment the system further includes a sensor and control system, such as, but not limited to, one including a gas chromatograph, for monitoring at least one of the syntheses gas and the output gas and adjusting the feeds based on the sensing.

In a still further embodiment, there is described, A system for generating hydrogen from hydrocarbons comprising: means for creating a mixture of diesel fuel, water, and air; means for taking the mixture and increasing pressure and temperature to make the water supercritical; means for obtaining a synthesis gas including hydrogen from the mixture; means for increasing the percentage of hydrogen in the synthesis gas; and means for capturing the hydrogen in a form useful as fuel for a fuel cell.

DESCRIPTION OF PREFERRED EMBODIMENT(S)

Disclosed herein, among other things, is a supercritical water reformer (SCWR) for use in converting fuels into hydrogen. The operation of the SCWR utilizes a supercritical water (SCW) reactor in conjunction with other hydrogen harvesting and generation apparatus to produce a portable hydrogen generation system for use to generate hydrogen from hydrocarbons including hydrocarbon fuels.

The terms "fuels" or "hydrocarbon fuels" as used herein is intended to be a general term relating to liquid hydrocarbons generally used as fuel in motor vehicles, generators, or other internal combustion engine powered devices. However, fuels include all liquid hydrocarbons generally of the chemical formula $C_nH_m$, where n and m may be any value. This specifically includes, but is not limited to hydrocarbons classified as paraffins ($C_nH_{2n+2}$), naphthenes ($C_nH_{2n}$), olefins ($C_nH_{2n}$), and aromatics ($C_nH_{2n-6}$). Fuel is also occasionally used to refer to the use of hydrogen as fuel for a fuel cell, but such use is clearly indicated where it occurs.

Fuels also specifically include, but are not limited to, gasoline, diesel fuel and jet fuel, as well as fuel additives, biomass fuels, or alternative fuels used for motor vehicles or internal combustion engines such as ethanol or biodiesel. Generally, fuels will comprise a mixture of hydrocarbons (particularly with chemical formulas between and including $C_6H_{14}$ and $C_{22}H_{46}$). Some more prevalent hydrocarbons present in fuel are methane ($CH_4$), propane ($C_3H_8$), ethane ($C_2H_6$), octane ($C_8H_{18}$) and dodecane ($C_{12}H_{26}$). The discussion below will presume the exemplary fuel used is classified as "diesel fuel" by the refining industry to illustrate a preferred embodiment. Generally, diesel fuel refers to fuel having most carbon numbers between 10 and 22. This exemplary embodiment, however, should not be taken as limiting as one of ordinary skill in the art would understand how the process can be applied to any fuel, hydrocarbon, or combination of hydrocarbons.

Further, while hydrocarbon fuels are the preferred fuel for the SCWR to convert to hydrogen, one of ordinary skill in the art would understand that and SCWR can reform other hydrocarbons and biomass fuels into hydrogen gas. Therefore in an embodiment of the invention, the fuels used may be any hydrocarbon of the form $C_nH_m$.

Figure 1:
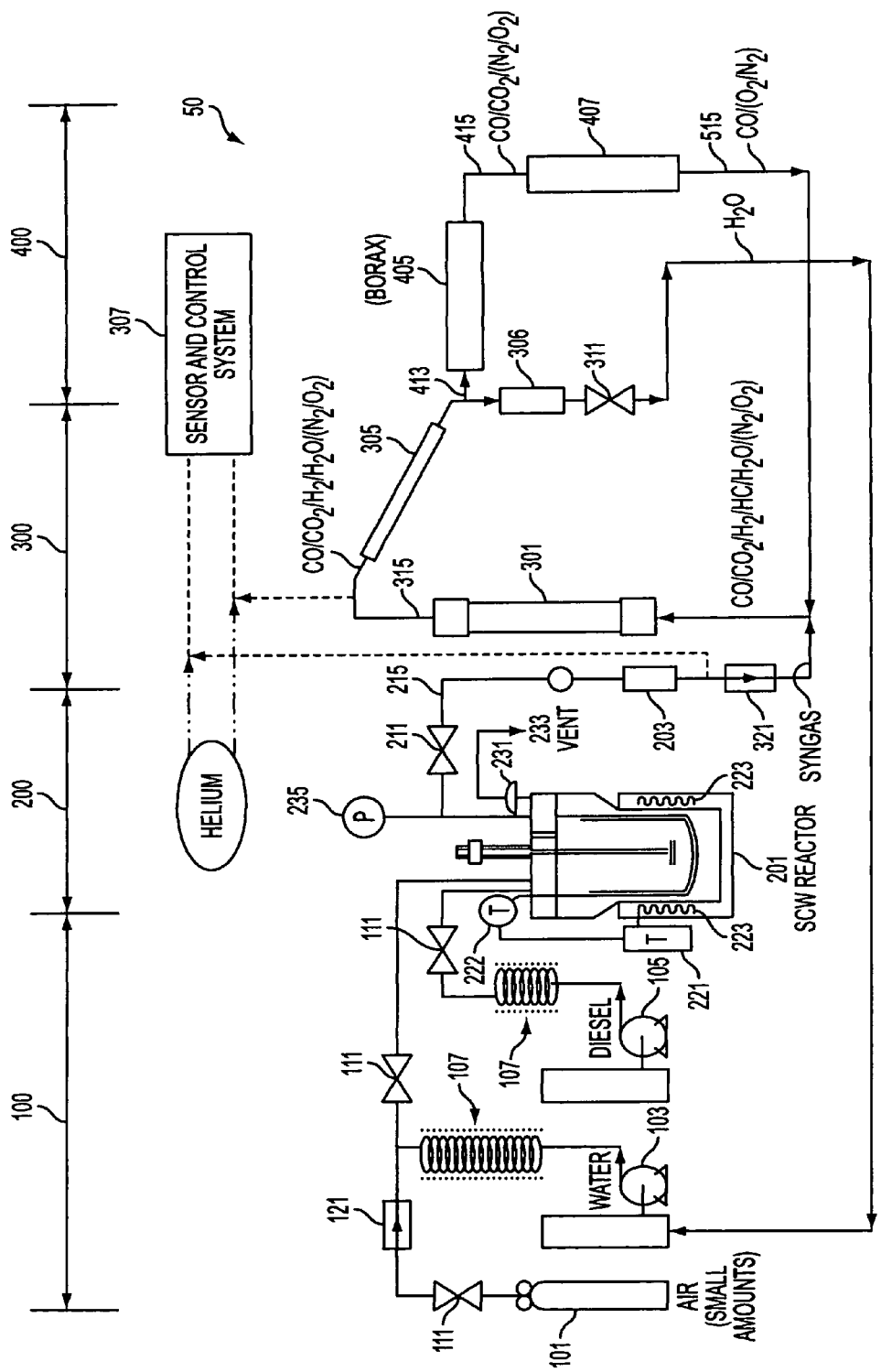
FIG. 1 shows an embodiment of a supercritical water reformer (SCWR) for use to reform diesel fuel into hydrogen.

FIG. 1 provides an embodiment of a block diagram showing the layout of a supercritical water reformer (SCWR) (50) which can reform diesel fuel into lighter hydrocarbons such as methane, ethylene, and ethane, and ultimately into synthesis gas, i.e., carbon monoxide (CO) and hydrogen ($H_2$). In FIG. 1 there are generally four broad component stages which relate to the operation of the SCWR (50).

In the stage one components (100) diesel fuel and a supercritical water/air mixture is prepared. In the stage two components (200), a supercritical water (SCW) reactor (201) reforms the diesel fuel, water, and air mixture into a synthesis gas comprising a mixture of hydrogen, carbon dioxide ($CO_2$), and carbon monoxide (CO). This synthesis gas is then carried in a feed stream (215) with other compounds such as sulfur dioxide ($SO_2$), nitrogen ($N_2$), oxygen ($O_2$), and water ($H_2O$). In the stage three components (300) a purification reactor such as a forward water-gas shift (WGS) reactor (301) is used to reduce carbon monoxide content and increase hydrogen content in the synthesis gas. In the stage four components (400), the hydrogen is captured into an easily transportable and storable form such as a chemical hydride. Other materials are either discarded or recycled back into the SCWR (50).

In the stage one components (100) there are three chemical feeds: air feed (101), water feed (103) and diesel fuel feed (105). The air feed (101) is generally arranged so as to allow air to be obtained from a pressurized air tank or from simply pumping in atmospheric air. In a preferred embodiment, the percentage of air in the resultant mixture will be of significantly smaller amounts than the other two ingredients or may be eliminated in an alternative embodiment. In a preferred embodiment air comprises from 1-10% by moles of water fed and at the same time 0-50% by moles of diesel fuel. Mass flow controller (121) controls the amount of air mass flowing in air feed (101). The air fed by air feed (101) will generally comprise a mixture of nitrogen, oxygen and various other gases. Generally the nitrogen will comprise about 78% of the mixture, oxygen about 21% of the mixture and the other gases comprising 1%. For the purpose of this disclosure, the exact composition of the other gases will be ignored as their effect is relatively minimal on the resulting reaction. In an alternative embodiment, the air feed (101) may actually feed pure oxygen into the system as the air feed (101) is principally used to feed oxygen. The nitrogen is generally present but not utilized.

Figure 2:
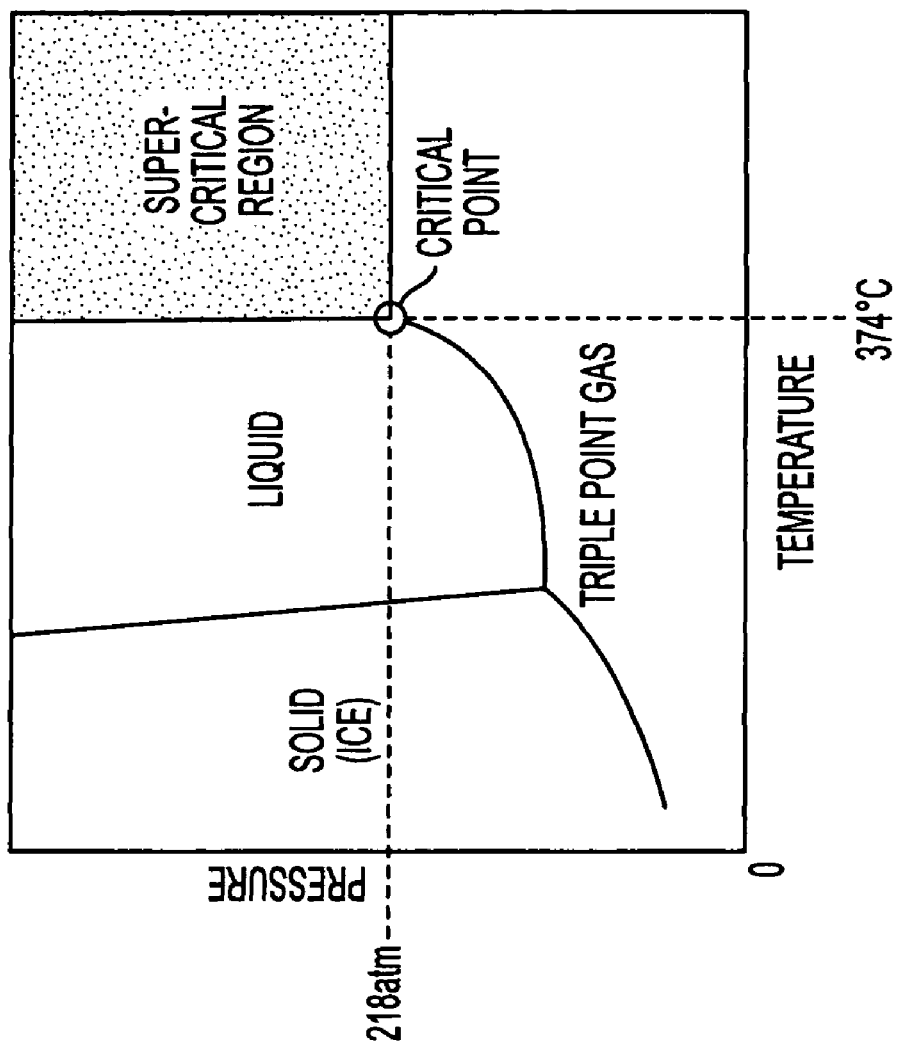
FIG. 2 shows a graph indicating the states of water and showing the supercritical state.

Each of the water feed (103) and diesel fuel feed (105) are liquid pumps designed to feed water or diesel fuel into the system using any type of liquid feed technology known now or later developed. The pumps preferably pressurize the water and diesel fuel to a pressure level at or above the critical pressure of water (218 atm) shown in FIG. 2. The water feed (103) in the depicted embodiment utilizes an enclosed cycle where the water fed by the water feed (103) is water removed from the input or resultant output of the WGS reactor (301). This type of self-contained system is preferable as it allows for more efficient use of water in the SCWR (50). Before the water and diesel fuel are mixed in SCW reactor (201), they will generally pass through preheaters (107) where they are heated to a level approaching or possibly passing the critical temperature of water (374° C.) as shown in FIG. 2. The air and supercritical water are preferably mixed prior to entering SCW reactor (201). The preheating step places a lower requirement on the SCW reactor (201) to heat the mixture which can result in an SCWR which can produce hydrogen faster upon activation. Generally, there will be valves (111) between the air feed (101), diesel fuel feed (105), water feed (103), and the SCW reactor (201) to prevent back feed, to regulate the amount of each material provided to the resultant input mixture, and to maintain the pressure inside the SCW reactor (201).

As the input mixture of supercritical water and air, and the diesel fuel enters the second stage components (200) they both enter into the SCW reactor (201). The SCW reactor (201) is typically a vessel constructed according to known high pressure design codes of Hastelloy-C276 or Inconel. In a preferred embodiment, the SCW reactor (201) construction material includes nickel which has a mild catalytic effect on the reforming reaction. While the catalytic effect is a bonus, poisoning (as discussed later) is generally avoided due to the extractive nature of supercritical water. In an alternative embodiment, the reactor may be constructed of stainless steel. The SCW reactor (201) may be either a mixed-type or continuous tubular type. As depicted in FIG. 1, the SCW reactor (201) is equipped with heating elements (223). As the supercritical reforming reaction is exothermic, the energy requirements of the SCW reactor (201) may be, in an embodiment, self-sustaining.

In the SCW reactor (201), the supercritical water drives the chemical reformation of the fuel into hydrogen, carbon monoxide, carbon dioxide, and water. The SCW reactor (201) performs this reforming through the properties of supercritical water. In particular: supercritical water completely dissolves both diesel fuel and oxygen, thus establishing a homogeneous reaction phase without need to raise the temperature excessively as was required in ATR reforming. Further, due to the intimacy (or close proximity) between reactant molecules in supercritical water, there is no need for a heterogeneous catalyst to perform the reforming. Instead, only the two components of fuel and water are required acting as both the components of the reaction and the cause of the reaction. Generally, the reforming in SCW reactor (201) will occur according to the following chemical relation:

$$C_nH_m + nH_2O = nCO + (n + \tfrac{1}{2}m)H_2 \quad \text{Equation 1}$$

Where n and m are used generally to represent any hydrocarbon being reformed. Further, Equation 1 may show slight variation if particular hydrocarbons are being used which have a slightly different structure. Equation 1 simply provides the stoichiometric requirements that in the interaction the number of water moles present needs to match the number of carbon moles in the hydrocarbon. The exact numbers for diesel fuel are determined experimentally and will depend on particular fuel formulations. Further, in operation as the water acts as both reactant and reaction medium there will generally be a significant excess of water provided to the SCW reactor relative to Equation 1 to meet process requirements.

In the embodiment of FIG. 1, a very small amount of oxygen (preferably 0-2% by moles of water feed and 0-10% by moles of diesel fuel) is introduced into the reaction to accelerate the reforming by combining with some of the carbon in the diesel fuel to form additional carbon monoxide or carbon dioxide. Further, the introduction of small amounts of oxygen (air) can help with carbon-carbon bond cleavage and can provide a seed amount of carbon monoxide molecules to the system. This oxygen is generally introduced as a component of air from air feed (101). In an alternative embodiment, oxygen (air) need not be included. Typically, however, this alternative embodiment will require higher temperature.

In the depicted embodiment, the SCW reactor (201) is monitored by a temperature controller (221) which senses the internal temperature of the SCW reactor (201) using temperature transducer (222), and as necessary applies additional heat input to the SCW reactor (201) using heating elements (223) to maintain the temperature in the SCW reactor (201) is at or above the critical temperature of water. The pressure inside the SCW reactor (201) is preferably monitored by pressure transducer (235), and as necessary the pressure of water feed (103) and diesel fuel feed (105) is adjusted to maintain the pressure in the SCW reactor (201) at or above the critical pressure of water. Pressure relief valve (231) also monitors the pressure inside the SCW reactor (201) to detect pressure reaching dangerous levels, if such high levels are detected, pressure will be released from SCW reactor (201) via vent (233).

Generally, the SCW reactor (201) will also output sulfurous compounds (such as sulfur dioxide ($SO_2$) or hydrogen sulfide ($H_2S$)) from interaction with sulfur impurities in the fuel (as Equation 1 presumes pure hydrocarbons which hydrocarbon fuels rarely are). These sulfurous compounds can foul ATR reactors or other types of reformers but have little effect on the SCW reactor (201). Further, as the air fed by air feed (101) generally includes a non-trivial amount of nitrogen this will also be output. Under supercritical water conditions, nitrogen generally does not react with oxygen so nitrogen oxides ($NO_x$) are not formed. The temperature is too low for such formation. Therefore, nitrogen simply passes through the SCW reactor (201).

Once the SCW reactor (201) has reformed the diesel fuel and water into the synthesis gas of Equation 1, the resultant feed stream (215) (including the synthesis gas) is passed through a pressure regulating valve (211) and into a molecular sieve (203). Valve (211) also serves to help maintain the pressure inside SCW reactor (201). The molecular sieve (203) is a device designed to trap molecules of certain types. In this case, the molecular sieve (203) principally serves to capture any sulfurous compounds (particularly sulfur dioxide) and carbonyl compounds created in or passed through the SCW reactor (201). The sieving can occur using any technology known to those of ordinary skill in the art such as, but not limited to, absorptive materials or materials having limited pore size to prevent passage of molecules above that particular pore size. This removal is desirable because the sulfurous compounds can generally not be further refined to produce additional hydrogen and can affect the effectiveness of the stage three components (300). Therefore, they are preferably removed at this stage and discarded. In another embodiment, the molecular sieve (203) is used in conjunction with active carbon beds placed in series. This combination is particularly effective in small scale systems.

Since there are no noble metal or other heterogeneous catalysts involved in the fuel reforming reaction (Equation 1) as can be seen above, the process efficiency is not affected by the presence of the sulfurous compounds (such as sulfur dioxide or hydrogen sulfide) or carbonyls (iron penta-carbonyl or nickel carbonyls) in the stage two components (200). Therefore, expensive sulfur pre-cleanup stages required for other reforming techniques can be eliminated. Further, carbon soots are not formed in the SCW reactor (201) which does not require their elimination or cleanup.

The stage three components (300) are principally related to increasing hydrogen content in the feed stream (215) output by the SCW reactor (201). In particular, the feed stream (215) output by the SCW reactor (201) contains nontrivial amounts of carbon monoxide (CO) (as shown in Equation 1). The beneficial conversion of carbon monoxide (CO) into hydrogen ($H_2$) becomes a desirable step. This type of conversion is known and may be performed using a forward water-gas shift (WGS) reactor (301) which operates generally according to Equation 2:

$$CO + H_2O = CO_2 + H_2 \qquad \text{Equation 2}$$

The water required for the reaction may be water from the stage two (200) components. In an alternative embodiment, additional water may be added to the feed stream (215) at the WGS reactor (301) if needed or excess water vapor may be removed from the feed stream (215). In particular, the water collector (306) may provide water from prior reactions back to the WGS reactor (301) to provide the necessary water if needed. However, generally to make the WGS reactor (301) operate in the forward direction to increase available hydrogen (as opposed to increasing carbon monoxide), water will be removed from the feed stream (215) prior to the WGS reactor (301). The flow of feed stream (215) into WGS reactor (301) is preferably controlled by mass flow controller (321) as shown in FIG. 1.

The WGS reaction will generally be carried out over a metal oxide catalyst such as zinc oxide on an aluminum support ($Zn O/Al_2O_3$) at around 200° C. As is known to those of ordinary skill in the art, the WGS reaction equilibrium can be easily reversed by changing the compositions (specifically the carbon monoxide and water or carbon monoxide and carbon dioxide ratio) of the feed stream (215). In order to maximize the conversion, therefore, it is generally necessary to reduce the water concentration in the feed stream from the SCW reactor (201) into the WGS reactor (301). Further, because of the reversibility of the reaction, there will generally still be some carbon monoxide (generally around 0.5-1 percent) remaining in the output stream (315) of the WGS reactor (301). Further, the WGS reactor (301) enriches the hydrogen concentration while reducing the carbon monoxide concentration by Equation 2, the concentration of carbon dioxide also increased in the output stream (315) of the WGS reactor (301) compared to feed stream (215).

It should be clear at this stage that the WGS reactor (301) is therefore releasing an output stream (315) of different chemical species including synthesis gas components, carbon monoxide, carbon dioxide, and hydrogen. Further the output stream (315) may include nitrogen, water, and oxygen as well as other trace gases left over from inputs and incomplete reactions. As the output stream (315) is prepared to enter the stage four components (400), the temperature will now generally be further lowered to allow precipitation of the water out of its gaseous stage. This precipitation may be performed by a condenser (305). The resultant liquid water is collected by water collector (306) and fed back through valve (311) to water feed (103) for reuse as shown in the embodiment of FIG. 1. In an alternative embodiment, the liquid water may be recycled back to WGS reactor (301) or may be removed from the SCWR (50) and discarded.

The stage four components (400) capture and store hydrogen and recycle the other components back into other stage components of the SCWR (50) for reuse or further purification. Water which needs to be removed prior to the WGS reactor (301) can also be cycled back around to the water feed (103). Generally, the SCWR (50) will require no water input as that recycled is the same as that originally used. However, in an alternative embodiment, water may be added or removed from the SCWR (50) at water feed (103) or at any other point.

Hydrogen may be captured by any method known to those of ordinary skill in the art to capture hydrogen, but is preferably captured by using a capturing system (405) where the remaining output stream (413) of condenser (305) is passed over a metal or compound such as boron (borax) or sodium to form a chemical hydride such as boron hydride or sodium hydride. Metal alloys including titanium, manganese, nickel, and chromium, as well as alkali earth metals, may alternatively be used as storage media. In a still further embodiment carbon nanotubes may be used to capture hydrogen in the capturing system (405). When using a chemical hydride, particularly a metal hydride, hydrogen can be captured in a simple reaction even under a low-temperature/pressure environment. Further, the release of hydrogen is convenient as it merely requires contacting the hydride with water and capturing the resulting gas. The selectivity of metal hydride capture is also good compared to unintended capture of other gases provided in the remaining output stream (413) resulting a relatively high capture of hydrogen and relatively low capture of any other gases.

After hydrogen capture, carbon dioxide may be removed from the system as it is not particularly useful to recycle. To perform this removal, acid gas removal (AGR) reactor (407) may be placed in the resultant gas stream (415). The AGR reactor (407) may utilize polyethylene glycol dimethyl ethers or other components suitable for absorbing carbon dioxide to remove the carbon dioxide from the resultant gas stream (415). Once the carbon dioxide has been removed from the process it should be clear that the remaining gas stream (515) is now only left with carbon monoxide and the residual nitrogen and oxygen. These components can then be returned to the WGS reactor (301) to attempt to obtain hydrogen from the remaining carbon monoxide. Nitrogen and oxygen may be bled off or otherwise removed if necessary or may simply be cycled.

Control of the SCWR (50) is performed in the embodiment of FIG. 1 by monitoring the SCW reactor (201) output stream (feed stream (215)) and the WGS reactor (301) output stream (315). A sensor and control system (307) containing a gas chromatograph or other suitable gas sensor determines the hydrogen content in feed stream (215) and in output stream (315), and adjusts the air feed (101), water feed (103), and diesel fuel feed (105) to control the amount of inputs into the SCW reactor (201). The sensor and control system (307) may control air feed input into the SCW reactor (201) by means of mass flow controller (121). The sensor and control system (307) further may control input into the WGS reactor (301) by means of mass flow controller (321). The sensor and control system (307) may be manually regulated or may automatically regulate the process such as by use of a digital processor.

Alternative embodiments of SCWR (50) may include energy recovery means such as heat exchangers to reclaim heat from the output of the SCW reactor (201) to use to pre-heat water feed (103) and diesel fuel feed (105), and pressure or work exchangers to reclaim pressure from the output of SCW reactor (201) to pressurize water feed (103), diesel fuel feed (105), the water and fuel feeds into the SCW reactor (201).

The embodiment of FIG. 1 does not require a particularly large setup, or particularly complicated operation. Compared to ATR systems, the SCWR (50) operates at a relatively low temperature. Further, because the process operates in a condensed phase, particularly under the high pressure of the SCW reactor (201), the SCWR (50) size can be substantially smaller than an ATR reactor. It is seen that the SCWR (50) could be assembled to be readily vehicle portable to a variety of locations. In particular, the SCWR (50) would be able to fit on a pallet such as a forklift pallet or a 463L pallet as used by the United States Air Force. Alternatively, a scaled up version of the SCWR (50) could be placed in an over-the-road (OTR) truck trailer or on a pallet, crop, or flatrack utilized by Load Handling System (LHS) trucks such as the HEMTT-LHS truck used by the United States Army.

Because of the relatively low temperature operation, the relatively simple hydrogen capture, and the portable size of the SCWR (50), the SCWR (50) is suitable for use in a variety of locations to provide a ready source of hydrogen, such as to power fuel cell vehicles, generators, or other devices. In particular, the SCWR (50) may be placed at an existing service station where it can obtain hydrocarbon fuel from the existing service station's tanks which it reforms into hydrogen to provide to fuel cell vehicles. In the military context, the SCWR (50) can be transported to a site where diesel fuel is provided (such as an existing fuel dump or similar site) and can then reform the diesel fuel to hydrogen to allow the use of military fuel cell technology without having to overhaul military infrastructure to provide for hydrogen transportation.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A system for reforming diesel fuel into hydrogen comprising: feeds for water and diesel fuel;
   a supercritical water (SCW) reactor in fluid communication with said water feed and said diesel fuel;
   at least one pump in fluid communication with said diesel fuel feed and configured to pressurize said diesel fuel feed to a predetermined pressure at or greater than the critical pressure of water before the water and the diesel fuel are mixed in the SCW reactor;
   at least one pump in fluid communication with said water feed and configured to pressurize said water feed to a predetermined pressure at or greater than the critical pressure of water before the water and the diesel fuel are mixed in the SCW reactor;
   at least one pre-heater in thermal communication with said water feed, said diesel fuel feed and said pumps that is configured to heat water from said water feed and diesel fuel from said diesel fuel feed to a predetermined temperature equal to or greater than the critical temperature of water before the water and the diesel fuel are mixed in the SCW reactor;
   a water-gas shift (WGS) reactor; and
   a hydrogen capturing system;
   wherein,
   said SCW reactor reforms said diesel fuel into a synthesis gas comprising a mixture of hydrogen and carbon monoxide and outputs said synthesis gas;
   wherein
   said synthesis gas output by said SCW reactor is fed into said WGS reactor which converts said carbon monoxide into carbon dioxide and hydrogen and outputs an output gas including a higher percentage of hydrogen to carbon monoxide compared to said synthesis gas, and
   said hydrogen in said output gas is captured by said hydrogen capturing system.

2. The system of claim 1 wherein said capturing system captures said hydrogen in a chemical hydride.

3. The system of claim 2 wherein said chemical hydride is sodium hydride.

4. The system of claim 2 wherein said chemical hydride is boron hydride.

5. The system of claim 1 wherein oxygen is fed into said SCW reactor in conjunction with said diesel fuel and said water.

6. The system of claim 5 wherein said oxygen is fed as a component of air.

7. The system of claim 1 further comprising a sensor and control system for monitoring at least one of said synthesis gas and said output gas and adjusting said feeds based on said sensing.

8. The system of claim 7 wherein said sensor and control system comprises a gas chromatograph.

9. A system for generating hydrogen from hydrocarbons comprising:
   a diesel fuel pressurizing unit that pressurizes a diesel fuel feed to a pressure equal to or greater than the critical pressure of water before diesel fuel is mixed with water;
   a water pressurizing unit that pressurizes a water feed to a pressure equal to or greater than the critical pressure of water before the water is mixed with the diesel fuel;
   a preheating unit that preheats the diesel fuel and water to a temperature equal to or greater than the critical temperature of water before the water and the diesel fuel are mixed;
   a synthesis gas obtaining unit that obtains a synthesis gas comprising a mixture of hydrogen and carbon monoxide from a mixture of the preheated diesel fuel, the preheated water, and air;
   a hydrogen increasing unit that increases the percentage of hydrogen in said synthesis gas; and
   a hydrogen capturing unit that captures said hydrogen in a form useful as fuel for a fuel cell.

10. A system for reforming jet fuel into hydrogen comprising:
    feeds for water and said jet fuel;
    a supercritical water (SCW) reactor in fluid communication with said water feed and said jet fuel;
    at least one pump in fluid communication with said jet fuel feed and configured to pressurize said jet fuel feed to a predetermined pressure at or greater than the critical pressure of water before the water and the jet fuel are mixed in said SCW reactor;
    at least one pump in fluid communication with said water feed and configured to pressurize said water feed to a predetermined pressure at or greater than the critical pressure of water before the water and the jet fuel are mixed in the SCW reactor;

at least one pre-heater in thermal communication with said water feed, jet fuel and said pumps that is configured to heat water from said water feed and jet fuel from said jet fuel feed to a predetermined temperature equal to or greater than the critical temperature of water before the water and the jet fuel are mixed in said SCW reactor;

a water-gas shift (WGS) reactor; and a hydrogen capturing system;

wherein, said SCW reactor reforms said diesel fuel into a synthesis gas comprising a mixture of hydrogen and carbon monoxide and outputs said synthesis gas, said synthesis gas output by said SCW reactor is fed into said WGS reactor which converts said carbon monoxide into carbon dioxide and hydrogen and outputs an output gas including a higher percentage of hydrogen to carbon monoxide compared to said synthesis gas, and said hydrogen in said output gas is captured by said hydrogen capturing system.

11. The system of claim 10 wherein said jet fuel is JP-8 fuel.

12. The system of claim 10 wherein said capturing system captures said hydrogen in a chemical hydride.

13. The system of claim 12 wherein said chemical hydride is sodium hydride.

14. The system of claim 12 wherein said chemical hydride is boron hydride.

15. The system of claim 10 wherein oxygen is fed into said SCW reactor in conjunction with said diesel fuel and said water.

16. The system of claim 15 wherein said oxygen is fed as a component of air.

17. The system of claim 10 further comprising a sensor and control system for monitoring at least one of said synthesis gas and said output gas and adjusting said feeds based on said sensing.

18. The system of claim 17 wherein said sensor and control system comprises a gas chromatograph.

* * * * *

UNITED STATES PATENT AND TRADEMARK OFFICE
CERTIFICATE OF CORRECTION

| | |
|---|---|
| PATENT NO. | : 8,038,743 B1 |
| APPLICATION NO. | : 10/723543 |
| DATED | : October 18, 2011 |
| INVENTOR(S) | : John R. Wootton et al. |

It is certified that error appears in the above-identified patent and that said Letters Patent is hereby corrected as shown below:

In claim 10, column 11, line 2, after "feed," please insert --said--.

Signed and Sealed this
Twenty-seventh Day of March, 2012

David J. Kappos
*Director of the United States Patent and Trademark Office*